United States Patent [19]

Tchernev

[11] 3,925,212
[45] Dec. 9, 1975

[54] DEVICE FOR SOLAR ENERGY CONVERSION BY PHOTO-ELECTROLYTIC DECOMPOSITION OF WATER

[76] Inventor: Dimiter I. Tchernev, 3905 Sierra Drive, Austin, Tex. 78731

[22] Filed: Jan. 2, 1974

[21] Appl. No.: 430,085

[52] U.S. Cl. ............................................. 250/527
[51] Int. Cl.² ........................................ B01K 1/00
[58] Field of Search ........ 204/129; 136/89; 250/527

[56] References Cited
UNITED STATES PATENTS

| | | | |
|---|---|---|---|
| 2,870,344 | 1/1959 | Brattain et al. | 136/89 |
| 3,271,198 | 9/1966 | Winogradoff et al. | 136/89 |
| 3,615,854 | 10/1971 | Emmasingel | 136/89 |
| 3,811,954 | 5/1974 | Lindmayer | 136/89 |

*Primary Examiner*—R. L. Andrews
*Attorney, Agent, or Firm*—Mason, Mason & Albright

[57] ABSTRACT

Electrodes for photoelectrolysis of water are composed of thin films of semiconductors which are electrically connected by at least one electrolyte solution. Solar energy causes the emission of minority carriers at the junctures of each electrode and the electrolyte. With a potential difference of more than 1.23 volts the electrolyte generates hydrogen and oxygen gases and, in addition, may produce sufficient electric current for a load connected across the electrodes. A cell may be of a sandwich type with a glass top and an n-type semiconductor electrode applied to the bottom of the glass with an intervening conductive mesh. Under and contacting this electrode is the electrolyte solution followed by a p-type semiconductor electrode on a metal substrate or a conductive metal mesh. The cell is hermetically sealed by an insulating material at the sides and includes an inlet for make-up water and an outlet or outlets for the emission of the oxygen and hydrogen gases. Also, outlets for positive and negative terminals are provided. The upper electrode, whether p or n type, is the one having the larger energy band gap and thus absorbs radiant energy of the higher frequencies whereas the underlying electrode has a smaller energy gap and absorbs most radiations not absorbed by the upper electrode. Current flow may be increased for given radiation wave lengths by introducing certain dyes in the electrolyte.

16 Claims, 4 Drawing Figures

DEVICE FOR SOLAR ENERGY CONVERSION BY PHOTO-ELECTROLYTIC DECOMPOSITION OF WATER

BACKGROUND OF THE INVENTION

Conversion of solar energy to other energy forms may be carried out by a number of known means. These are frequently found in nature. For example, conversion of heat controls climate which is utilized for power generation. Conversion of chemical energy from the sun takes place in plants and bacteria. But, photovoltaic converters are expensive and generally not efficient.

Water is decomposed by electrolysis with application of voltage above 1.23 V. Inasmuch as water is transparent to visible light with energy above 1.23 eV, it does not photo-decompose directly until the radiation energy is above 6.5 eV which corresponds to a wave length well in the ultra violet range — shorter than 190 nm. The reason for this is that part of the energy of photo-decomposition is released in heat when the hydrogen and oxygen molecules are formed — such energy level being 3.5 eV and 1.7 eV respectively. Thus, less than 20 percent of the photo-energy is converted to chemical energy. With an electrolytic process, there need be only a charge transfer between the electrodes and the electrolyte and a net electrochemical energy of 1.23 eV plus small resistive heating losses at high currents for the process. It is therefore advantageous electrochemically to photo-decompose water. The hydrogen and oxygen gases produced by electrolysis are 99.8 percent or more pure and may be directly utilized for heating applications. It is a clean fuel with water vapor being the only product of combustion.

It is known that direct photo-electrolysis of water is possible, the same having been reported by A. Fujishima and K. Honda in 1972 for an n-type $TiO_2$ electrode for light energy above 3.0 eV (wave length of 415 nm). See NATURE, Volume 238, July 7, 1972, page 37. This type of reaction is possible only at the interface of a semiconductor electrode and the electrolyte. Photo-voltaic effects are possible not only in p-n junctions but also in rectifying metal-semiconductor junctions. For such an effect, an optical hole-electron pair must be produced either within or near a region of large potential gradient such as for example the depletion, or barrier, area, of p-n, or rectifying, junctions.

SUMMARY OF THE INVENTION

The invention relates to a system wherein semiconductors are utilized as electrodes for the solar energy conversion by photo-electrolytic decomposition of water into the gases of hydrogen and oxygen. More specifically, it relates to use of the semiconductor — electrolyte interface for direct conversion of solar energy into chemical energy by decomposing water into hydrogen and oxygen gases and, in addition, by photo-voltaic conversion of part of the solar energy into electrical power which is obtained at low cost as a by-product.

The interface between a liquid electrolyte and a semiconductor is similar to a metal-semiconductor junction and can be an ohmic contact or a rectifying junction, depending upon the relative position of the fermi levels and work functions. Thus, such interface may be considered as an intermediate case between a heterojunction and a metal-semiconductor junction. With a n-type $TiO_2$ electrode, photo-chemical decomposition of water and the direct conversion of solar energy into chemical energy may be represented as a process in the rectifying metal-semiconductor junction or in one-half of a p-n junction. Thus, taking as an example, a $TiO_2$ n-type semiconductor interface with an electrolyte, when light is absorbed in the n-type semiconductor, it creates pairs of holes and electrons. Each pair is separated as soon as it is created because of the electric field gradient depicted by the downward bending of the conduction and valiance bands. The electrons thus drift into the bulk of the semiconductor while the holes drift to its surface where they may combine with the $HO^-$ ions and result in the evolution of oxygen gas. In a p-type semiconductor electrode, the corresponding process involves the creation of hole-electron pairs by the absorption of light. The electrons in this case are forced to drift to the surface while the holes drift into the bulk of the semiconductor material. At the semiconductor-electrolyte interface, the electrons are transferred to the liquid where they combine with the $H+$ ion and cause the evolution of hydrogen gas. Examples of such photo-decomposition of water with hydrogen evolution are known for p-type semiconductors of GaP and GaAs. However, in all such examples, only one of the electrodes has been a semiconductor, whereas the other electrode in each case was either a metal or a saturated calomel electrode (SCE). Attention is thus invited to U.S. Pat. No. 3,271,198 of Sept. 6, 1966, to N. N. Winogradoff et al. where there is a semiconductor silicon-platinum-electrolytic photoelectric cell with the second electrode being composed of metal.

An important object of the instant invention is to improve the efficiency of photoelectrolytic decomposition of water by utilizing at least two semiconductor electrodes, one of the n-type and one of the p-type. By providing that the radiation is absorbed at both electrodes, instead of only one as taught by the prior art, the output of the cell is increased substantially for a given amount of radiation and the solar energy is thus utilized more efficiently.

In addition, it is a further object of the invention to utilize the energy distribution of the solar spectrum by using two semiconductors with different energy band gaps for the electrodes whereby the solar energy received first by the larger gap semiconductor electrode absorbs a portion of the radiation energy and the smaller band gap semiconductor electrode, receiving solar energy which passes through the first electrode, absorbs substantially the remaining portion of the radiation.

Other objects, adaptabilities and capabilities of the invention will be understood by those skilled in the art to which the invention pertains, reference being had to the accompanying drawings, in which:

DESCRIPTION OF THE PREFERRED EMBODIMENTS

Figure 1:
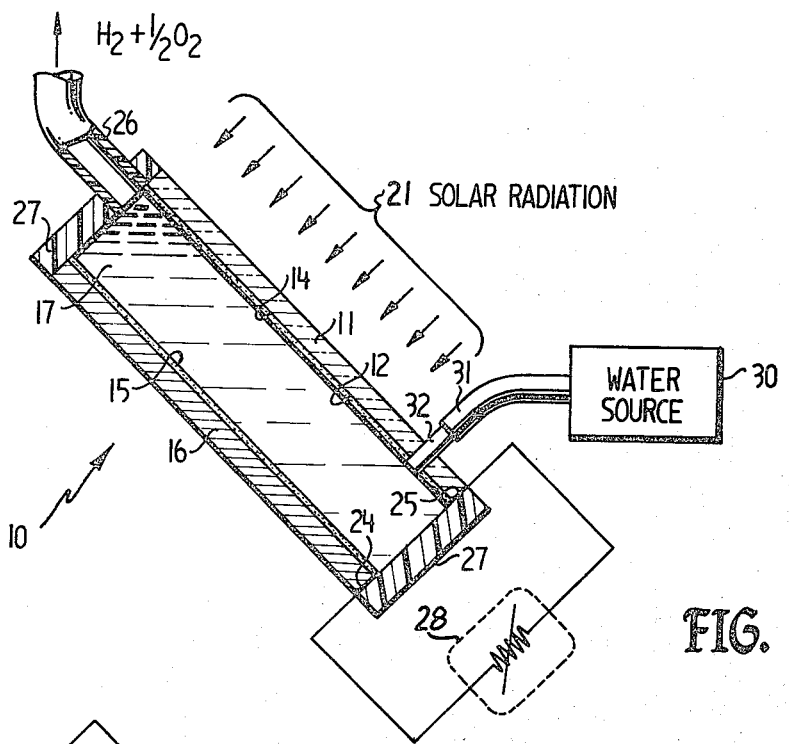
FIG. 1 diagrammetrically illustrates an electrochemical photolysis cell in accordance with the invention.

Referring to FIG. 1, a container 10 with a cover 11 of transparent material of plastic or, preferably, glass has two semiconductor electrodes, an n-type 12 applied directly to the underside of the cover 11 (which is preferably provided with a contacting mesh 14 in accordance with well established solar cell technology), and a p-type 15 applied directly to a metal substrate 16 at the bottom of container 10. Both semiconductor electrodes 12 and 15 are immersed in a suitable electrolytic solution 17.

Figure 2:
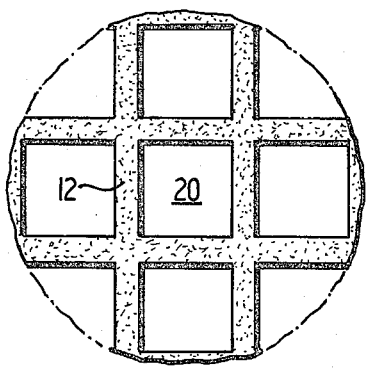
FIG. 2 shows the surface application of a semiconductor with windows for the passage unabsorbed light.

According to one example, the electrodes 12 and 15 may be of the same semiconductor material, for example, silicon. In such event, with the sandwich type cell illustrated in FIG. 1, the semiconductor material constituting electrode 12 is preferably provided with windows 20 as illustrated in FIG. 2 whereby approximately 50 percent of the radiation is received and absorbed by electrode 12 and the unabsorbed 50 percent is absorbed by the semiconductor material of electrode 15. With electrodes 12 and 15 composed of silicon semiconductor material, an acidic electrolytic solution is preferred, for example one made of $H_2SO_4$ in water. With such an electrolyte 17 and solar energy 21 applied as illustrated in FIG. 1, light is absorbed by the electrodes 12 and 15 and pairs of holes and electrons are created at their surfaces. However, with electrodes 12 and 15 being silicon semiconductors, a potential bias should be applied to one or both of the semiconductor electrodes of several hundred mv, say 200 – 300 mv.

The electrodes 12 and 15 may be, and preferably are, composed of different semiconductor materials, for example $TiO_2$ and InP. As may be understood with reference to FIG. 4, wherein different semiconductor materials are involved, a bending of energy bands takes place which facilitates a charge transfer into electrolyte 17 in analogy to the photo-voltaic effect in the p-n junction of a photo-voltaic converter, except that the p-and n-type electrodes are separated by the electrolyte 17. It will be noted in FIG. 4 that both the n-type semiconductor and the p-type semiconductor have energy band gaps which are equal to or exceed 1.23 eV, the minimum energy level for the electrolysis of water. When the different semiconductor materials are used, the type having the larger energy band gap should receive the solar ration first. The larger energy band gap usually exists in the n-type semiconductor which therefore receives the initial radiation. The p-type semiconductor usually has a smaller energy band gap and thus receives solar radiation not absorbed by the n-type semiconductor. Illumination of the barrier regions of the semiconductors generates electron-hole pairs so that sufficient minority carriers drift towards the surface of the semiconductors and create a current across the electrolyte and also through terminals connected to each semiconductor. For the purposes of the instant invention, it is desired that the major portion, say 80 percent, of the solar energy be converted to chemical energy, and a lesser portion, say 20 percent, be provided for the external circuit. This ratio is adjustable within limits depending on the ratio of chemical energy to the electrical energy desired from the power output of the cell.

Figure 4:
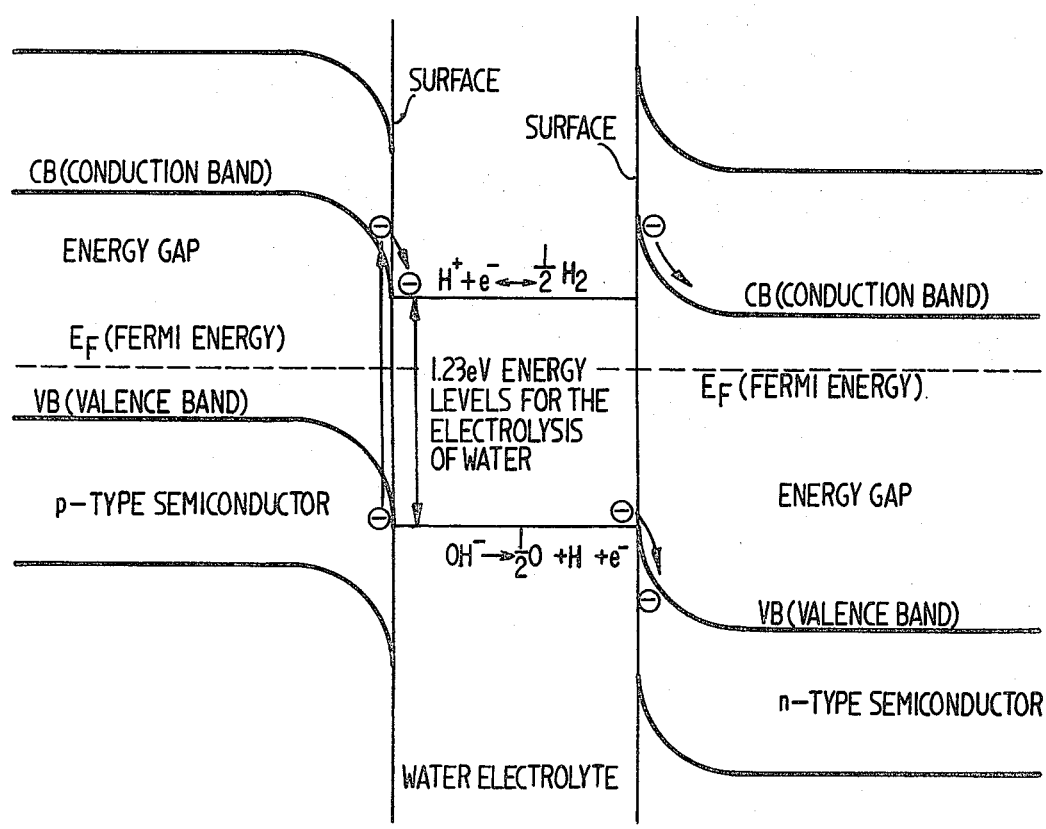
FIG. 4 is a graph showing electric potential versus position for a p-type semiconductor, an n-type semiconductor, and an electrolyte forming an interface with either semiconductor.

It will be noted from FIG. 4 that the fermi energy level is essentially level across the energy band gap of both semiconductors and also across the electrolyte.

Electrons emitted from the p-type semiconductor and minority carriers combine with H+ions to create one $H_2$ molecule whereas minority hole carriers of the n-type semiconductor take electrons away from the $OH^-$ radical to create $O_2$ and H+ ions.

From an understanding of FIG. 4, it will be apparent that cell 10 must be provided with terminals 24 and 25 or the like to close the circuit. They may connect across a load resistance 28 from semiconductor electrodes 15 and 12 respectively. A mixture of hydrogen and oxygen gases is emitted through a tube 26 which enters the top of cell 10 through a side 27 thereof of insulating material having a high dielectric constant. Side 27 surrounds the cell in order to maintain same in water-type condition. Inasmuch as water in electrolyte 17 becomes depleted due to the generation of hydrogen and oxygen therefrom, a suitable water source 30 is provided to admit makeup water into cell 10 through a tube 31 which connects to inlet 32 at a convenient and appropriate location in cell 10. The thickness of the electrodes 12 and 15 are exaggerated in FIG. 1 — being in actuality only a few microns in thickness. Preferably, they are at least three or more times the thickness delineated as the attenuation length where light is absorbed to $1/e$ of its original intensity. The bending of the energy bands in the electrodes, as illustrated in FIG. 4, should be about three attenuation lengths. The electrode 15 may be somewhat thicker inasmuch as it need not be transparent for the purposes of avoiding undue absorption of the solar radiation. However, it should not be so thick as to restrict electrical conduction to the substrate metal 16.

Figure 3:
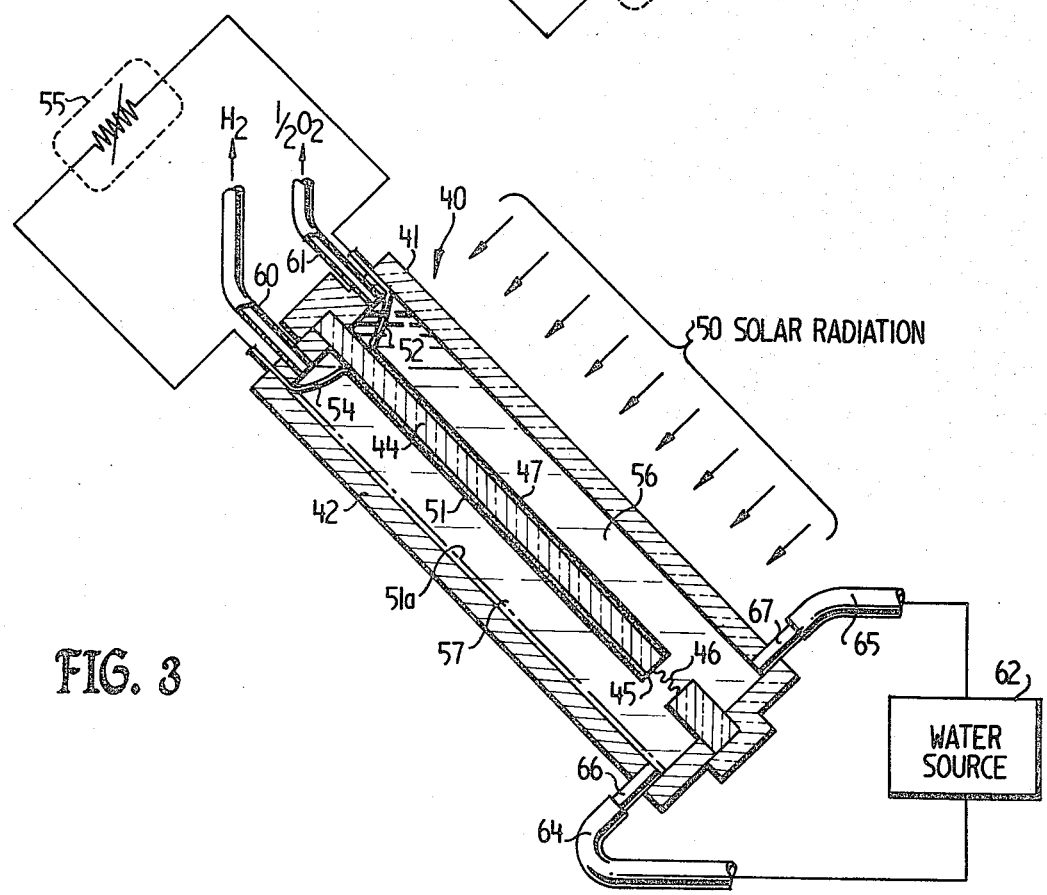
FIG. 3 diagrammetrically illustrates another electrochemical photolysis cell in accordance with a further embodiment of the invention.

FIG. 3 discloses a further embodiment wherein hydrogen and oxygen may be generated separately. Thus, there is illustrated a cell 40 which has a transparent, preferably glass, cover 41 received on a metal base 42 with an intervening transparent insert 44. Insert 44 includes an opening 45 across which there is a semipermeable membrane 46. Membrane 46 may be any suitable commercially available ionic exchange membrane which will permit the passage of the oxygen and hydrogen ions, but prevent larger electrolyte ions such as $SO_4^-$ from penetrating same. Insert 44 also includes on its upper side a thin layer n-type semiconductor electrode 47 such as $TiO_2$ and on its lower side a further thin layer semiconductor electrode 51, such as InP. Due to the larger energy gap of $TiO_2$, only that portion of solar radiation 50 in the shorter wave band of the spectrum is absorbed by the electrode 47. The remainder of the radiation is largely absorbed by the p-type semiconductor electrode 51 which is applied to the underside of the insert 44. Preferably, both electrodes 47 and 51 have an underlying conductive meshes which connect to leads 52 and 54 respectively which, in turn, connect outside of cell 40 to a load 55. The electrolyte 56 in the upper part of cell 40 is preferably an acid type electrolyte, a mole of $H_2SO_4$ in an $H_2O$ solution. However, the electrolyte 57 may be of a different type, for example, a salt, at least 0.1 moles of KCl or a base solution of 0.1 moles of KOH in a water solution. With the p-type electrode InP, current densities up to $3 mA/cm^2$ produce voltages up to 1 volt and the hydrogen gas output is about two liters for each meter of insert 44 per hour at STP(Standard Temperature and Pressure). Again, with other combinations of electrodes, more electrical energy or more hydrogen fuel energy may be produced depending upon the choice of electrode materials and the electrolytic solutions 55 and 57.

A pair of outlets 60 and 61 from the lower and upper portions of cell 40, respectively, carry hydrogen and oxygen respectively. Makeup water is provided from a water source 62 via tubes 64 and 65 into connections 66 and 67 respectively of the lower and upper portions of cell 40. If desired, the electrode 51 may be applied directly to the metal base as indicated by dotted lines as electrode 51a. In such case, a conducting mesh is not required nor need the electrode 51a be as thin as electrode 51. In such case, the contact 54 is applied to electrode 51a.

In operation of the embodiment disclosed in FIG. 3, solar radiation 50 is absorbed in part by electrode 47 to create a "hole" current wherein $O_2$ is generated and hydrogen ions migrate through the membrane 46 into the electrolyte 57. Electrode 51, with its lower energy gap, absorbs light not absorbed by electrode 47 and thereby causing the generation of minority electrons which combine with hydrogen ions to create the hydrogen gas which is emitted through outlet 60. The E.M.F. created produces a current which may be utilized outside cell 40 by load 55 which takes its current via terminals from leads 52 and 54.

Oxides are preferred for the n-type semiconductor electrodes inasmuch as they usually have large energy band gaps. Also, an oxide is usually stable for the $O^2$ evolution. In addition to $TiO_2$, CdO, NiO and ZnO may be desirable as n-type semiconductor electrodes. For the $TiO_2$, a Ph of 4.7 is preferred for the electrolyte. The p-type semiconductor electrode may be Si, Ge, Ga, As, GaP, InP, CdTe, or for that matter, any other suitable semiconductor having an energy band gap which is less than the n-type electrode.

It is important for an efficient system that the electrode which receives the radiation initially have the larger energy band gap — and that the electrode receiving the unabsorbed ration therethrough have a smaller energy band gap rather than whether each may be a n-type or p-type semiconductor.

Inasmuch as hydrogen evolution occurs at the p-type semiconductor electrode, corrosion generally does not pose a problem. However, the electrolyte solution should be such that electrode dissolution does not take place.

Increases in current for given wave lengths may be obtained by the addition of dyes to the electrolyte solutions. Dyes known to produce such effect include cryptocyanine, rhodamine-B, rose bengal, crystal violet, and dyes of the quinone family such as benenzo-quinone.

Having thus described my invention, what I claim as new and desire to secure by Letters Patent of the United States is:

1. A device producing a photoenergized decomposition of water comprising a container with at least one transparent member permitting the transmission of electromagnetic radiant energy into the container, at least two spaced semiconductor electrodes of different composition each comprising means absorbing at least part of said radiant energy thereby causing the emission of minority carriers therefrom, said semiconductor electrodes arranged in said container so that both said electrodes absorb at least part of said energy, said container adapted to contain an aqueous electrolytic solution in direct contact with both said electrodes, the composition of said electrolytic solution and of said electrodes being such that electrode dissolution does not take place during operation of the device, said minority carrier having a potential energy difference between said electrodes which is at least sufficient to cause decomposition of such electrolytic solution into hydrogen and oxygen gases, and an external circuit provided between said electrodes.

2. A device in accordance with claim 1 wherein the thickness of at least one said electrode is about three attenuation lengths of light.

3. A device in accordance with claim 2 wherein said electrode is spaced above the other said electrode, said one electrode having a larger energy and gap than said other electrode.

4. A device in accordance with claim 3 wherein said one electrode is an n-type semiconductor and is composed of a metal oxide.

5. A device in accordance with claim 4 wherein said other electrode is a p-type semiconductor and is thicker than said one electrode.

6. A device in accordance with claim 1, wherein one of said electrodes is an n-type semiconductor and the other of said electrodes is a p-type semiconductor.

7. Device in accordance with claim 6, wherein said electrodes are composed of the same basic semiconductor material except for the added impurities.

8. A device in accordance with claim 6, wherein the electrodes are made of different semiconductor materials.

9. A device in accordance with claim 8, wherein at least one said electrode is composed of a semiconductor material having an energy band gap of more than about 2 eV and the other said electrode is composed of a semiconductor material with an energy band gap of less than about 1 eV.

10. A device in accordance with claim 8, wherein said electrodes have different energy band gaps and said electromagnetic energy is received first on the semiconductor electrode having the larger energy band gap and the remaining transmitted electromagnetic energy falls on the semiconductor electrode having the smaller energy band gap.

11. A device in accordance with claim 1, wherein at least one of said electrodes is in a thin film form.

12. A device in accordance with claim 11, wherein said thin film is applied directly to said container.

13. A device in accordance with claim 1, wherein a further electrolytic solution of water is provided whereby each of said electrodes is in contact with a different electrolytic solution, said electrolytic solutions being divided by an ion exchange divider.

14. A device in accordance with claim 1, wherein said electrolytic solution contains a dissolved dye which increases the current flow between said electrodes.

15. A device in accordance with claim 1, wherein a potential bias is applied to at least one of said electrodes.

16. A device in accordance with claim 1 wherein at least one of said electrodes comprises an n-type semiconductor which is composed of a metal oxide.

\* \* \* \* \*